United States Patent
Caplette

[11] Patent Number: 6,012,257
[45] Date of Patent: Jan. 11, 2000

[54] BUS WINDOW GRAFFITI SHIELD MOUNTING WITH MOISTURE SEAL

[75] Inventor: Geoffrey K. Caplette, Altadena, Calif.

[73] Assignee: Transmatic, Inc., Waterford, Mich.

[21] Appl. No.: 08/870,477

[22] Filed: Jun. 6, 1997

[51] Int. Cl.[7] .................... E06B 1/04; E06B 3/00
[52] U.S. Cl. ............. 52/202; 52/204.1; 52/204.53; 52/204.593; 52/716.8; 52/718.01
[58] Field of Search ............... 52/202, 204.1, 52/211, 204.53, 204.59, 204.593, 204.595, 716.1, 716.4, 716.8, 717.01, 718.01, 718.04

[56] References Cited

U.S. PATENT DOCUMENTS

| | | | |
|---|---|---|---|
| 2,193,852 | 3/1940 | Axe | 52/204.595 |
| 2,256,548 | 9/1941 | Chaffee | 52/204.595 |
| 2,257,035 | 9/1941 | Chaffee | 52/204.593 |
| 2,285,003 | 6/1942 | Axe | 52/204.595 |
| 2,787,347 | 4/1957 | Henderson et al. | 52/211 |
| 2,872,713 | 2/1959 | Haas | 52/172 |
| 3,438,166 | 4/1969 | Bakke | 52/410 X |
| 4,018,022 | 4/1977 | Fink | 52/398 |
| 4,055,031 | 10/1977 | Okawa et al. | 52/172 |
| 5,131,194 | 7/1992 | Anderson | 52/144 |
| 5,242,207 | 9/1993 | Carson et al. | 296/146 |
| 5,735,089 | 4/1998 | Smith et al. | 52/202 |

OTHER PUBLICATIONS

Excel Advertisement Page "The Only Glazing Protection System"; Excel Industries, Inc.

*Primary Examiner*—Christopher Kent
*Assistant Examiner*—Brian E. Glessner
*Attorney, Agent, or Firm*—Christie, Parker & Hale, LLP

[57] ABSTRACT

A mounting for a window and at least one shield for protecting the window. In a typical embodiment, the window is rectangular, such as a bus window, and the shield is a thin flexible sheet of plastic. The window is mounted on elastomeric seals in a metallic frame and held in place by a second set of elastomeric seals. The shield is placed in a pre-formed trench of the inner elastomeric seals which creates an air gap preventing contact between the shield and the window. An inwardly curved and flexible lip extending above the trench is capable of bending back to conform to the surface of the shield when installed to form a water tight seal and to help hold the shield in place.

13 Claims, 5 Drawing Sheets

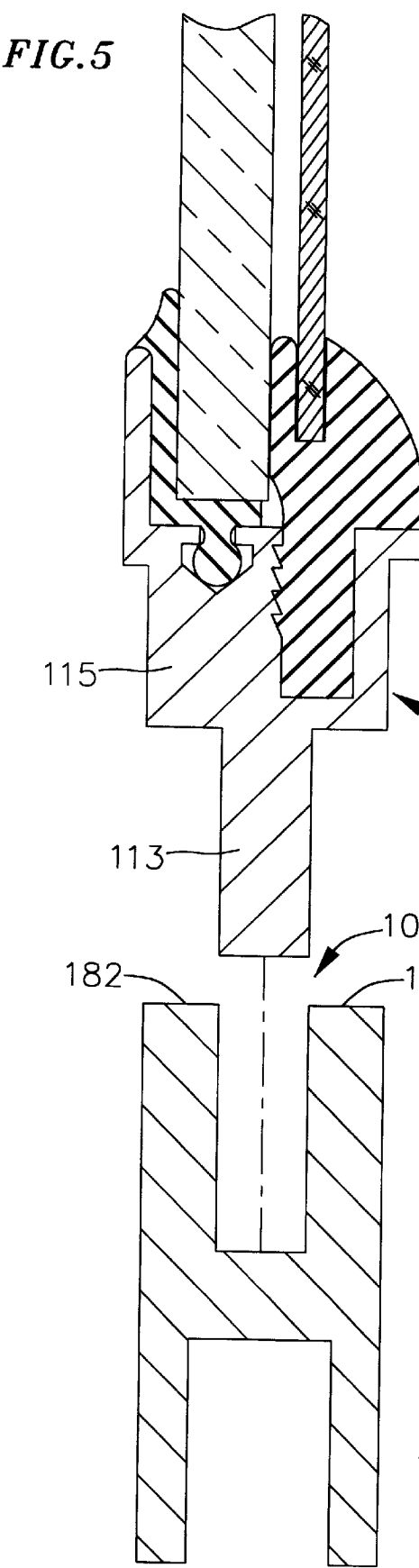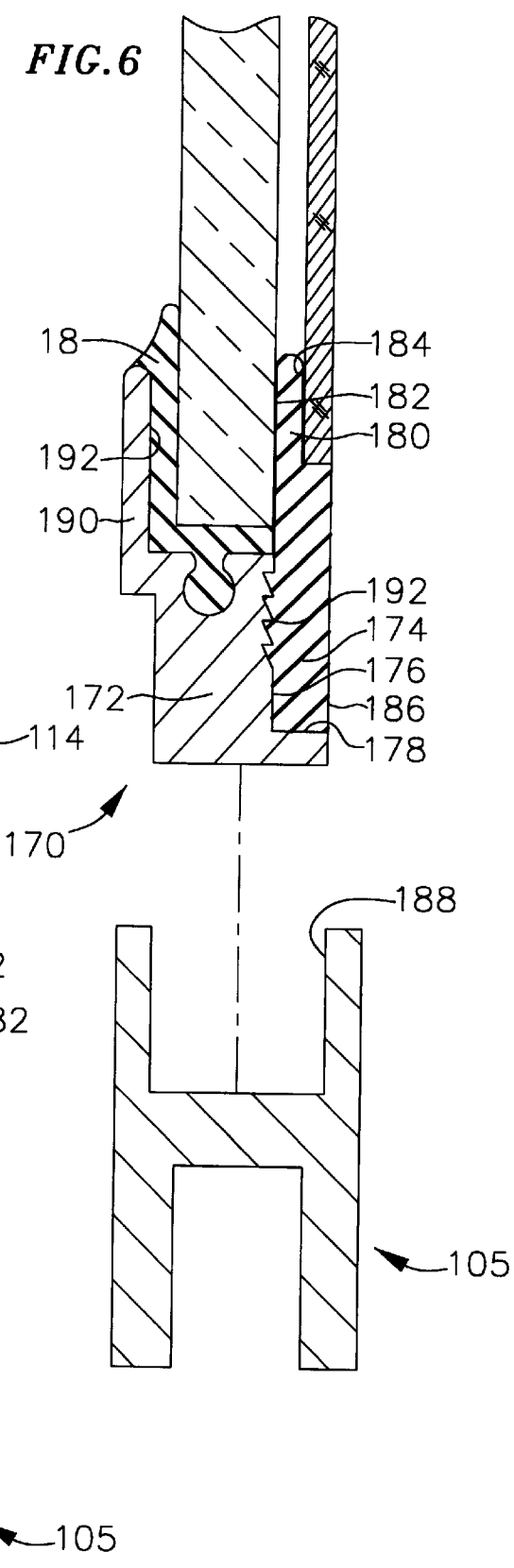

6,012,257

BUS WINDOW GRAFFITI SHIELD MOUNTING WITH MOISTURE SEAL

BACKGROUND OF THE INVENTION

Graffiti on windows in public areas has been a longstanding problem, particularly for windows on public transportation systems, such as subways and buses. One solution to the problem of graffiti on windows has been the mounting of transparent shields or guard panels on the windows. As a result, graffiti collects on the shield rather than the window. These graffiti shields are typically plastic and disposable. The windows themselves are often much more expensive to replace than a disposable plastic graffiti shield. When an undesirable amount of graffiti is present on the shield, the shield can be removed, disposed of, and replaced without replacing the window.

There have been various approaches to mounting the graffiti shields over the windows. One solution has been to use retaining strips which hold the graffiti shield over the window by clamping the edge of the shield between the strips and the window or the frame. The retaining strips are held to the frame with screws. By tightening the screws, the strips hold the graffiti shield in place. Another solution has been to use double-sided tape. The tape is applied directly to the face of the graffiti shield and then the shield is attached to the window or to the frame.

Both of these solutions to the problem of mounting the graffiti shield over the window have significant disadvantages. Using retaining strips held in place by screws is inefficient because the initial installation of the strips is difficult and expensive. In addition, replacing the graffiti shield is time consuming, as all of the strips must be removed by unscrewing the screws one by one. As a result, the threads in the retaining strips and the mounting for the retaining strips become worn and eventually stripped. This leads to the necessity of replacing the strips and eventually the mounting for the strips as well. Double-sided tape is a better solution, in that installation, replacement and maintenance are all simpler, but the graffiti shield panel itself is more expensive than the simple panel which can be used with the retaining strips.

Also, there are installation difficulties inherent in a dual glaze bus window system. The largest single problem is moisture intrusion between the two glazing plies. If there is an insufficient gap between the two plies, the water and/or moisture that may get in between the plies due to washing or normal condensation processes, may not drain properly. If this should occur and the trapped water cannot drain out properly, salt encrustations can form in between the window plies, and unacceptable optical coupling occurs when moisture is present.

Another problem typical in a dual glaze bus window system is that the sacrificial window (graffiti shield) is made of a relatively soft material, such as acrylic. If that material comes into contact with the structural glazing, such contact can create clouding or scratching due to the abrading of the window guard by the glass.

A solution which would allow the easy installation and replacement of inexpensive graffiti shields and that allows for proper drainage of any trapped moisture that happens to accumulate between the graffiti shield and the window and that keeps the graffiti shield and window sufficiently apart to prevent a damaging interaction would be an improvement in the art and of great public value.

Another problem with existing bus window systems is that the vast majority of windows in buses, trains, and other vehicles are installed in frames that surround the window on all sides to a minimum depth of ½ inch. Due to this depth of installation, when the window glazing is damaged or vandalized, much or all of the frame structure must be removed from the vehicle or disassembled before the window can be replaced. This time consuming process often requires 2 to 4 hours.

Quick change windows are becoming available, but the cost of retrofitting an entire vehicle is often very high. A solution which would provide a less expensive method of retrofitting existing window frames to make them quick change windows would be an improvement in the art and of great public value.

SUMMARY OF THE INVENTION

The present invention utilizes specially designed elastomer seals (such as rubber) to hold an easily removable graffiti shield in place over a window. Three types of seals are used, seals with a trench, seals with a partial trench, and exterior seals. In the case of a rectangular window, three seals with a trench are used on the lower, left and right sides, while one seal with a partial trench is used on the upper side. The seals help hold the window in place by sandwiching a portion of the window between the seals containing a trench or partial trench on one side, and the exterior seals on the other side. The graffiti shield is secured in place when inserted into the trenches and partial trench. When inserted, the graffiti shield is prevented from interacting with the structural glazing surface (window) by the trench wall adjacent to the window, ensuring no mechanical contact between the two surfaces and leaving an open air space between the window and the graffiti shield. The seals and air space substantially eliminate water entrapment.

The present invention further provides for adapting an existing window frame to accommodate a quick change feature. This feature allows the window glazing and graffiti shield to be replaced without removing the window frame from its mounting.

DESCRIPTION OF THE DRAWINGS

FIG. 5 is an exploded cross section view of a second embodiment of an adapter frame.

FIG. 6 is an exploded cross section view of a third embodiment of an adapter frame.

DETAILED DESCRIPTION OF THE INVENTION

The present invention comprises a system for holding a graffiti shield in place over the face of a window. A combination of elastomer seals is used to fix the window to a mounting and fix a graffiti shield over the window.

One embodiment of the present invention comprises a rectangular window and rectangular graffiti shield held in place by elastomeric seals. An exterior seal runs the length of the entire lower, upper, left and right sides. On the interior side, a seal with a trench runs the length of the lower, left and right sides, and a seal with a partial trench runs the length of the upper side. The interaction between the seals with a trench, or partial trench, and the exterior seals secure the graffiti shield and the window in place. The primary difference between the seals of the lower, left and right sides and the seal of the upper side is that the inner wall of the trench adjacent to the window, on the upper side, is only intermittently present to allow easy installation of the graffiti shield.

In describing the construction of embodiments of the graffiti shield mounting, the lower, left, right and upper components are essentially the same, except that the left and right side components are rotated 90°, as appropriate, and the upper components are rotated 180° and, as stated before, the inner wall of the trench on the upper seal is only intermittently present. As a result, the direction of "up" would be the appropriate direction for a part that is oriented toward the center of the window for the left, right, lower and upper sides, unless otherwise indicated.

Figure 2:
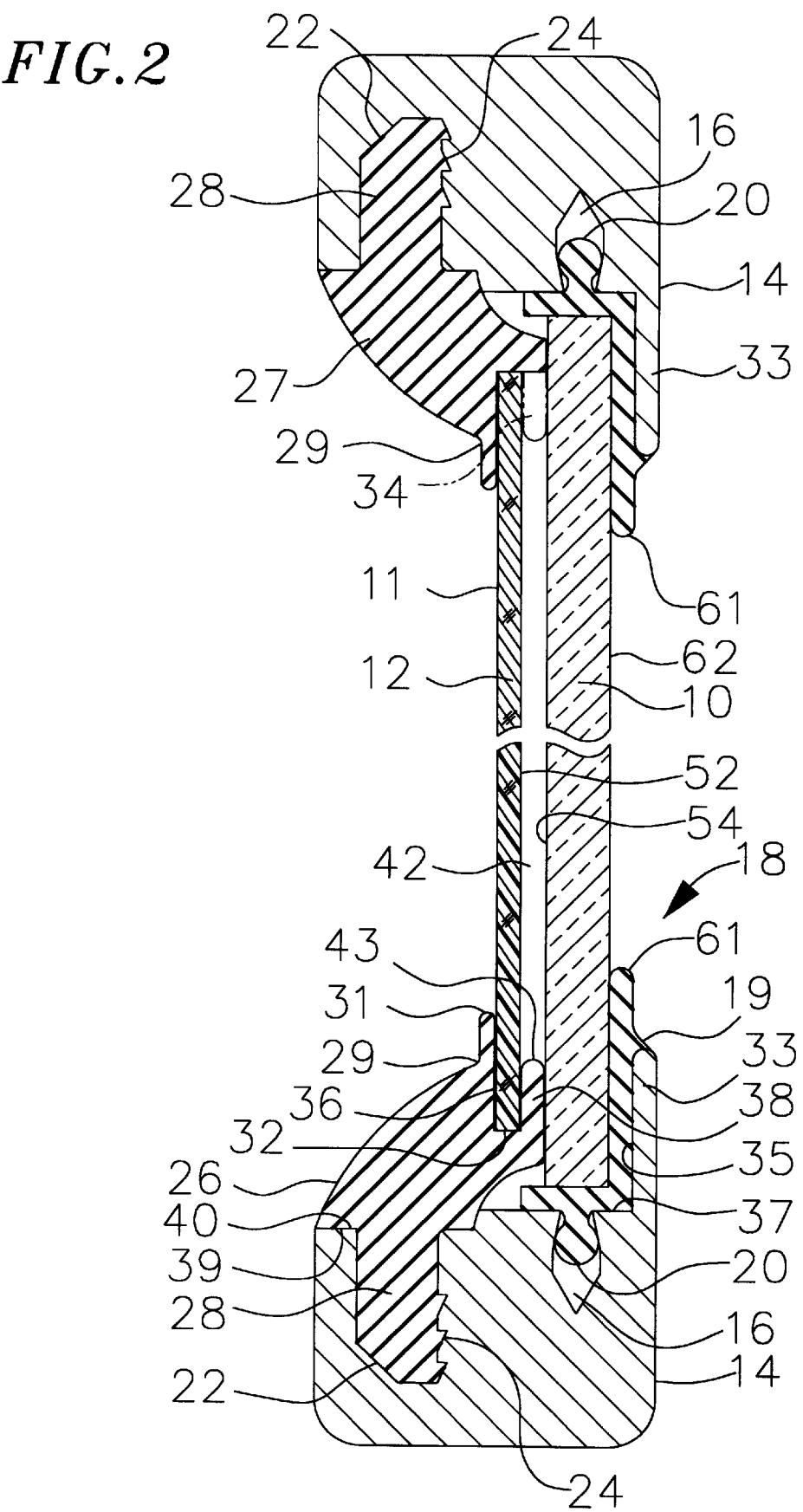
FIG. 2 is a transverse cross-section view of one embodiment of the present invention showing a seal with a trench on the lower side and a seal with a trench intermittently present on the upper side. The components which are located on the left and right sides are not shown because their construction is the same as those on the lower side, except that they are rotated 90°, as appropriate.

In addition, the directions "in" and "out" refer to left and right, respectively, in FIG. 2. It should be noted that this orientation is arbitrary and for descriptive purposes only. The embodiment can be constructed with either side being on the "outside" relative to the interior of the construction to which the mounting is attached or incorporated, such as the side of a bus.

FIG. 2 depicts a completely assembled configuration of a window 10 and a graffiti shield 12 mounted in a frame 14 and held in place by exterior seals 18, seals with a trench 26 on the lower side (the left and right sides are not shown in FIG. 2 because, as noted above, their construction is the same as the lower side but they are rotated 90°) and a seal with an inner trench wall intermittently present 27 on the upper side.

The window 10 is typically made from a sheet of rigid transparent material such as glass. The graffiti shield 12 is typically made from a thin sheet of flexible transparent material.

Figure 1:
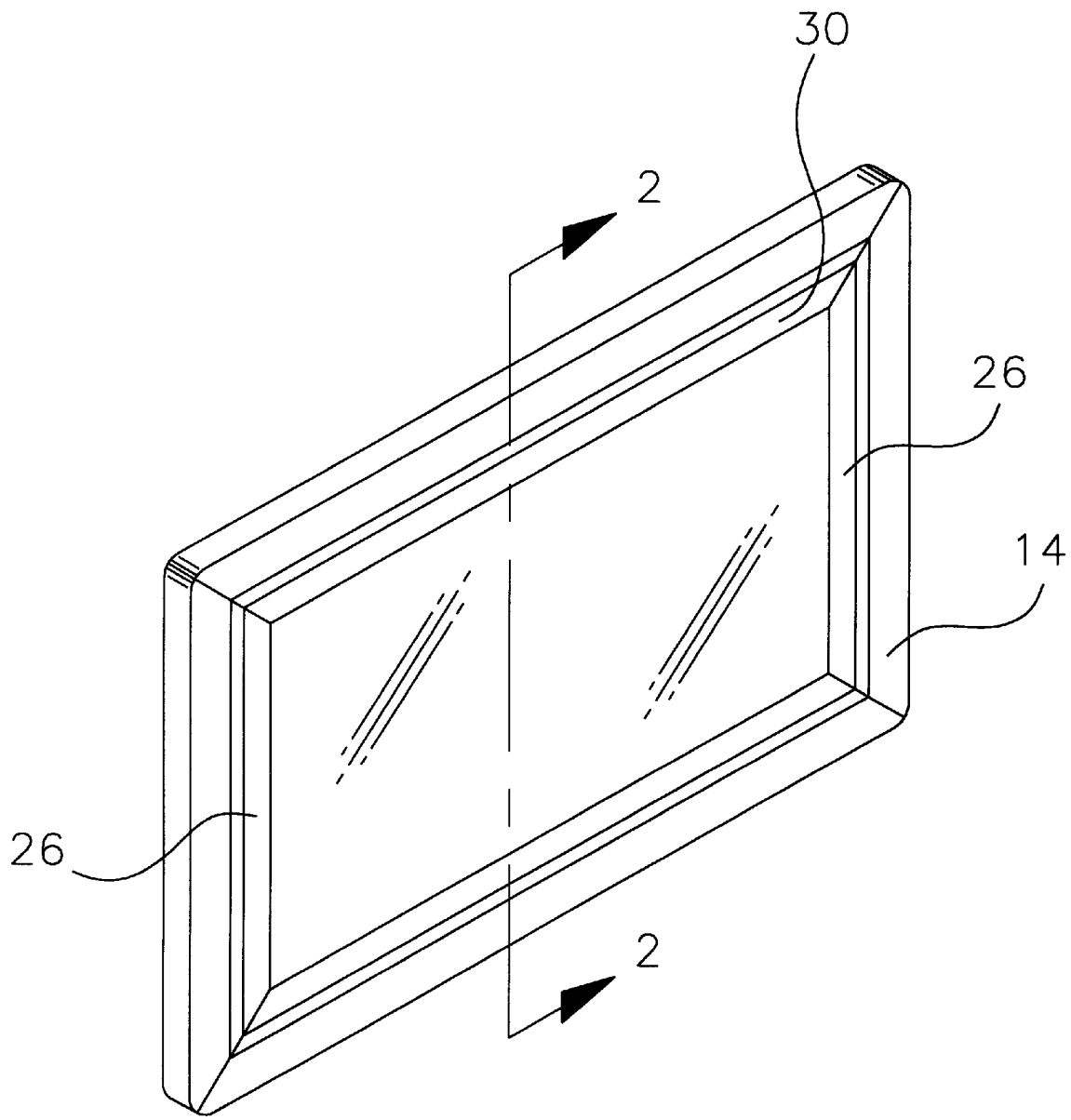
FIG. 1 is a view of one embodiment of the present invention completely installed. The graffiti shield is covering the window and the seals are on four sides holding the graffiti shield to the window.

The frame 14 may be constructed from one continuous piece or from multiple frame parts typically made from aluminum extrusions. The frame is used as the mounting for the window and the overlying graffiti shield. As illustrated in FIG. 1, the frame for the window and graffiti shield is made with four frame parts mitered at the corners. It is desirable, however, to make the frame with a single extrusion bent in a curve at the corners of the window since that is easier for installation and maintenance and has a better appearance.

The various seals (exterior 18, seals with a trench 26, and seal with an inner trench wall intermittently present 27) are elastomer extrusions, typically rubber. The seals are used to hold the window and graffiti shield in place in the frame and provide a water tight seal between the window and the frame.

Each frame part 14 has a generally L-shaped transverse cross section with a longitudinally extending opening 16 near the inside corner of the L for holding the exterior seals 18 in place. An inner side of the frame part projects upwardly forming a supporting projection 33 against which the exterior seal 18 rests. A deep longitudinally extending trough 22 inside one leg of the L-shaped frame part holds the seal with a trench 26, and the seal with a partial inner trench wall 27, in place. There are teeth 24 extruded along the length of the trough of the frame part. The teeth are slanted so that they form a one way retainer within the trough. This allows the seals to be inserted easily, while preventing them from sliding out. The seal with a trench 26, or seal with a partial inner trench wall 27, are easily removable with the use of a standard windshield installation tool (essentially a screwdriver with a hook on the end).

Essentially L-shaped exterior seals 18 surrounding the edges of the window are made from an elastomeric material and form a seal between the window and the frame parts. The exterior seals 18 are held in place by an integral clamping bead 20 which is inserted into the opening 16 running along the frame part. Resting against an inner side 35 of the supporting projection 33 and a lower side 37 of the frame, the exterior seal forms a shoulder against which the window 10 can rest. As a result, the window is not in contact with the metal frame, but is instead held in place in two directions (down and in) by the exterior seal 18. The exterior seals 18 form a barrier between the inner side of the frame parts and an outer face of the window. An exposed face 19 of the exterior seal 18 has a vertical projection 61, adjacent to and contacting an outer surface 62 of the window 10, to give an attractive appearance, better shed water and permit some bending for a good fit between the frame 14 and window 10.

Figure 3:
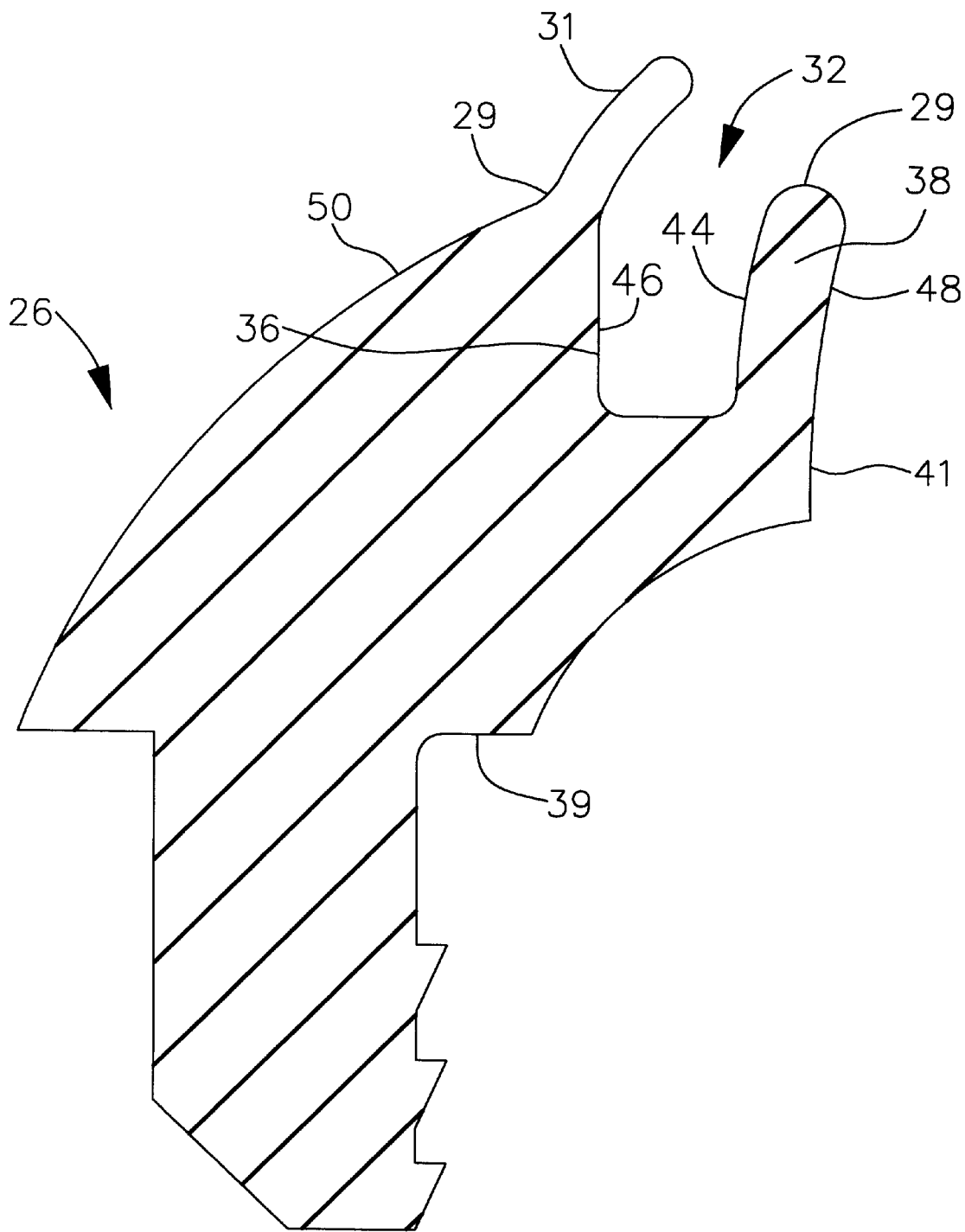
FIG. 3 is a cross-section view of the seal with a trench for the lower, left and right sides.

As shown in FIG. 3, the trench 32 is defined by an inner surface 44 of extension 38 on one side and an inner surface 46 of generally vertical extension 36. Above the trench 32 there is a lip 31 extending upwardly and inwardly from vertical extension 36. The lip 31 of both seals 26 and 27 has an at-rest shape before installation on a window as illustrated in FIG. 3, extending toward the vertical extension 38 and extending at least partially over the opening of the trench 32. When seals 26 and 27 are installed adjacent to a graffiti shield, the lip 31 of the seals bend back from its naturally curved position, conforms to, supports and seals off the graffiti shield 12 by extending upwardly beyond a top edge 29 of the trench as shown in FIG. 2. The elasticity of the rubber assures that the lip 31 fits tightly against the graffiti shield 12 and forms a water tight seal.

Seals 26 and 27 are also made from an elastomeric material. The seals are generally T-shaped with a head portion 30 generally transverse to vertical extensions, 36 and 38 respectively, protruding from the top of the approximate T-shape to form the trench 32. The primary difference between seal 26 and seal 27 is that the vertical extension 38 is only intermittently present on seal 27. The head portion 30 of seals 26 and 27 is also generally transverse to protrusion 28 extending downward into the trough 22 of frame 14. The seal with a trench 26 helps secure the window 10 into place against the exterior seal 18 by engaging an inner surface 41 of the seal 26 with an inner surface 54 of the window 10 and leaving vertical extension 38 snug up against the inner surface 54 of the window 10 along the outer surface 48 of the seal 26. Likewise, the seal with a partial inner trench wall 27 helps secure the window 10 into place against the exterior seal 18 by engaging an inner surface 41 of the seal 27 with an inner surface 54 of the window 10, except that the vertical extension 34 is only intermittently present and therefore its outer surface 48 is only intermittently in contact with the inner surface 54 of the window 10.

The interaction between vertical extensions 38 of opposite facing seals 26, and the interaction between vertical extension 38 of seal 26 and the intermittently present vertical extension 34 of opposite facing seal 27 prevents the window and graffiti shield from contacting one another, resulting in the creation of an air gap 42. The air gap allows water which may come between the window and second graffiti shield in the course of weather or washing to drain to the bottom. The essentially rectangular air gap 42 is defined by an inner edge 52 of the graffiti shield, an inner edge of the window 54 and the top surface 43 of extensions 38 and 34.

The protrusion 28 runs along a lower edge 39 of the seals 26 and 27 where they engage an upper edge of the frame 40 and is inserted into the trough 22 running along the upper side of each frame part. The corresponding mateably designed teeth in the trough lock the seals into place. After the graffiti shield has been inserted into the trench 32, however, it can be removed easily with a suction cup or by flexing the shield.

An outer surface 50 of the seals 26 and 27 tapers downwardly from the graffiti shield 10 to give an attractive appearance, better shed water and permit some bending for a good fit between the frame and graffiti shield.

To install a graffiti shield on an existing bus window, the top edge of the relatively thin, somewhat flexible graffiti shield is inserted into the partial trench of the upper side. Then, with the use of a tool like a screwdriver, one maneuvers the graffiti shield into the trenches 32 of the left, right and lower sides by forcing and manipulating the lip 31 of the seal 26 in a manner which allows the graffiti shield to engage the corresponding trenches, as well as allowing the lip 31 of the seals 26 and 27 to conform to, secure and seal the graffiti shield in place.

It will be noted that no screws, loose clips or similar fasteners are needed, which could strip and damage the frame parts. The elastomeric seals are themselves easily removable or replaceable if needed (i.e. damage or normal wear and tear), but are otherwise designed to be semi-permanently installed while providing the flexible and manipulative characteristics necessary to remove the graffiti shield. The savings in labor for replacing the graffiti shields can be substantial.

All of the components of this embodiment function together to: provide a mounting for the window; hold the window in place; provide a mounting for the graffiti shield which allows easy insertion and removal; and lock the graffiti shield in place apart from the inner face of the window.

The embodiment described above is only one of the possible embodiments of the present invention. The invention would work equally well for a window of various shapes (round, triangular, square, etc.). Nor is the invention limited to protecting a window. The graffiti shield could be used in conjunction with any surface which is to be protected. In an alternative embodiment the shield could be used to protect the underlying surface against the elements of weather in addition to or instead of vandalism. The only suggestion is that the shield should be constructed from a somewhat flexible material to allow for easy insertion and removal. A sheet of plastic in the order of a millimeter thick may be sufficient so that it may be flexed to be fitted in place in the frame, yet stiff enough not to flutter or otherwise deform when in position covering a bus window or the like.

Although described as a transparent graffiti shield mounting, it will be apparent that a mounting arrangement, as described, may be used in other contexts. For example, many buses carry advertising placards mounted in aluminum frames secured to the outside of the bus. A similar mounting arrangement may be used with a stiff paper or plastic placard used in place of the graffiti shield.

Figure 4:
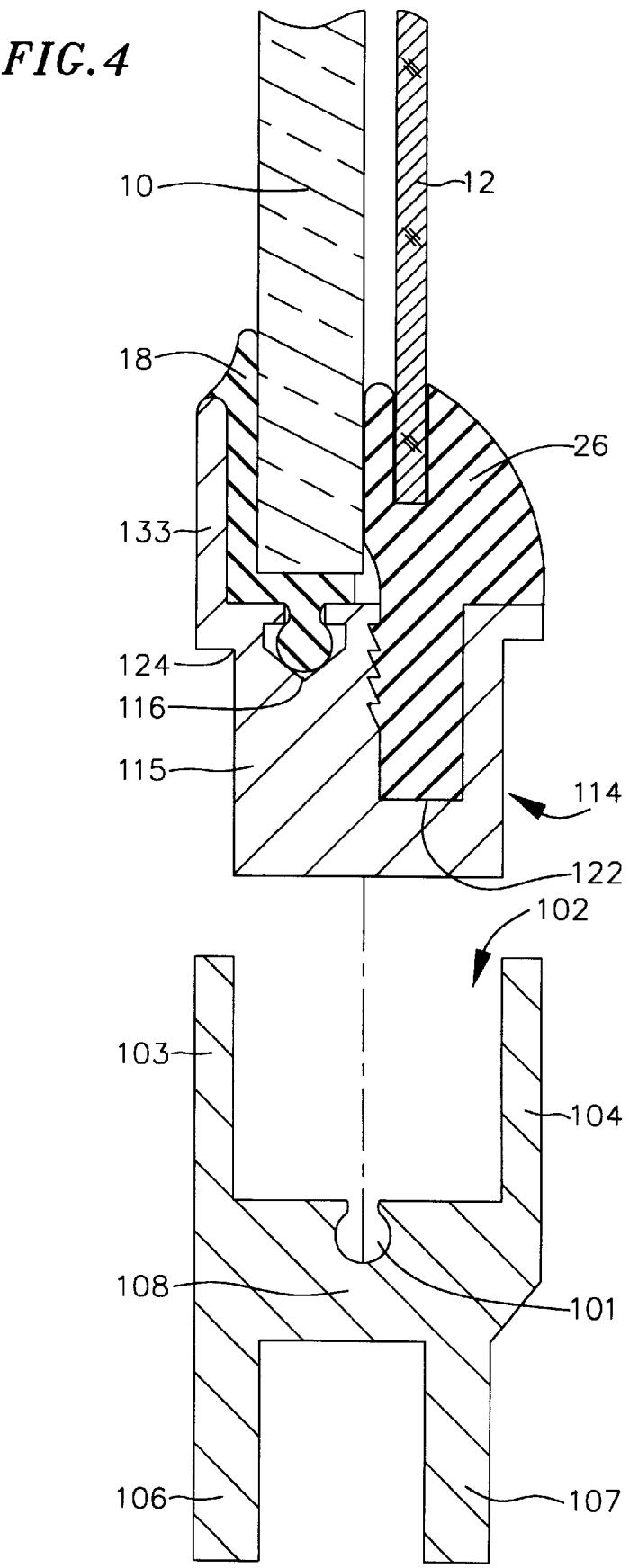
FIG. 4 is an exploded cross section view of one embodiment of an adapter frame.

FIG. 4 depicts a completely assembled configuration of an adaptor frame 114 installed in a window frame 105; a window 10 and a graffiti shield 12 mounted in the adaptor frame 114 and held in place by seals 18, 26 and 27.

The window frame 105 is typically aluminum, but could be made from any suitable frame material, including but not limited to various other metals or a plastic. The window frame 105 is generally H-shaped, having a lateral base 108, from which extends an outer upwardly directed arm 103, an inner upwardly directed arm 104, an outer downwardly directed leg 106 and an inner downwardly directed leg 107. A gutter 102 is formed between the arms 103 and 104. The existing frame 105 is attached to the vehicle by means of the legs 106 and 107.

Each adaptor frame part 114 has a generally L-shaped transverse cross section. The adaptor frame part has a longitudinally extending opening 116, near an inside corner of the L 124, allowing for partial insertion of the exterior seal 18. This partial insertion of the exterior seal helps secure the seal in place. A leg portion 133 of the L shaped adaptor frame projects upwardly forming a support against which the exterior seal 18 rests. A longitudinally extending trough 122 inside a foot 115 of the L-shaped frame part allows insertion of the seals 26 or 27, thereby securing the seals in place. Seals 26 and 27 are easily removable with the use of a standard windshield installation tool (essentially a screwdriver with a hook on the end).

The adaptor frame 114 may be constructed from one continuous piece or from multiple frame parts typically made from aluminum extrusions. The adaptor frame 114 is typically made from four parts, with mitered edges and scaled to fit within the inside dimensions of the window frame 105. The adaptor frame 114 can be shaped from one or more pieces to accommodate any shape the window frame 105 may be.

The adaptor frame 114 is produced such that the foot 115 of the adaptor frame 114 is insertable into the gutter 102. In some embodiments, there is a downwardly directed extension 113 from the foot 115 as shown in FIG. 5. In this embodiment, extension 113 is insertable in the gutter 102, leaving the foot 115 portion above the upper gutter edges 182. The foot 115 or extension 113 is secured to the existing frame 105 once the foot 115 or extension 113 is seated in the gutter 102. In a preferred embodiment, a silicone permanent sealant is used to secure and seal the adapter frame 114 to the existing frame 105. Once the adaptor frame 114 is secured to the existing frame 105, the window 10 and graffiti shield 12 are installed into the adaptor frame 114. In some embodiments there is a groove 101 running along the length of the gutter 102 as shown in FIG. 4. The groove 101 is used for securing a gasket (not shown) in place by way of a bead extending along the length of the gasket.

Another embodiment of the adaptor frame 170 is shown in FIG. 6. In this embodiment, the downwardly directed extension 172, itself, is generally L-shaped further defined by an inner vertical surface 176 and an inner horizontal surface 178. The adaptor frame 170 has an upwardly directed projection 190 extending above the window frame, said projection 190 having an inner surface 192 in contact with the exterior seal 18. The adaptor frame has a plurality of sockets 193 cut into the surface 176 to mateably interact with corresponding sockets in the interior seal 174. When installed, interior seal 174 contacts both surfaces 176 and 178 and is defined by a vertical extension 180 with a first surface 182 contacting the glass and a second surface 184 contacting the graffiti shield. Seal 174 is further defined by vertical surface 186 that substantially aligns with the inner surface of the graffiti shield. An inner surface 188 contacts vertical surface 186 of seal 174 when the adaptor frame is inserted into the window frame 105.

What is claimed is:

1. A graffiti shield mounting for a bus window comprising:
   a frame adapted to be connected to a side of a bus, the frame comprising one or more frame parts having a generally L-shaped transverse cross-section and a trough extending along the length of the frame part;
   a window mounted in the frame;
   a seal extending around the upper, lower and side edges of the frame, the seal including a lip and a trench with walls substantially parallel to the plane of the window, wherein one of the walls forming the trench of the seal along one of the edges of the frame is intermittently present;
   a graffiti shield having upper, lower and side edges fitted into the trench of the seal; and
   the lip of the seal, when not engaging the graffiti shield, naturally extending above the top of the trench capable of contacting and conforming to the outer surface of the graffiti shield for sealing and securing the graffiti shield in place.

2. A graffiti shield mounting for a bus window comprising:
   a frame adapted to be connected to a side of a bus, the frame comprising one or more frame parts having a generally L-shaped transverse cross-section and a trough extending along the length of the frame part;
   a window mounted in the frame;
   a seal extending around the upper, lower and side edges of the frame, the seal including a lip and a trench with walls substantially parallel to the plane of the window;
   a graffiti shield having upper, lower and side edges fitted into the trench of the seal; and
   the lip of the seal, when not engaging the graffiti shield, naturally extending above the top of the trench capable of contacting and conforming to the outer surface of the graffiti shield for sealing and securing the graffiti shield in place; and
   wherein the seal has a generally T-shaped cross section comprising:
      a longitudinally extending protrusion fitted into a longitudinal trough along an outer edge of the frame;
      a head portion transverse to the protrusion having an inner surface engaging an inner surface of the window; and
      a first upwardly generally vertical extension above the head portion where an inner surface of the extension defines one side of a trench and an outer surface of the extension directly contacts the window, the extension being substantially parallel to the protrusion, the vertical extension of the seal along one of the edges of the frame being only intermittently present;
      a second upwardly generally vertical extension above the head portion with an inner surface substantially parallel to the inner surface of the first vertical extension, an outer surface facing generally away from the graffiti shield with said lip, that naturally curves toward the first vertical extension, protruding beyond a top edge of the trench, said lip being capable of bending outwardly to form a substantially aligned extension to the inner surface of the trench by conforming to the vertical surface of the graffiti shield when the graffiti shield is inserted into the trench, the extension being substantially parallel to the protrusion.

3. A graffiti shield mounting comprising:
   a frame comprising one or more frame parts having a generally L-shaped transverse cross-section and a trough extending along the length of the frame part;
   an elastomeric seal extending around the upper, lower and side edges of the frame, the seal including a trench with two walls parallel to the plane of the window; and
   a graffiti shield having upper, lower and side edges fitted into the trench of the seal; wherein
   the elastomeric seal further comprises:
      a lip extending above the top of the trench and elastically deformed to a position at least partially over the trench for contacting and conforming to the outer surface of the graffiti shield for sealing and securing the graffiti shield in place, wherein the seal has a generally T-shaped cross section comprising:
         a longitudinally extending protrusion fitted into a longitudinal trough along an outer edge of the frame;
         a head portion transverse to the protrusion having an inner surface engaging an inner surface of the window; and
         a first upwardly generally vertical extension above the head portion where an inner surface of the extension defines one side of a trench and an outer surface of the extension directly contacts the window, the extension being substantially parallel to the protrusion, the lip of the first upwardly generally vertical extension of the seal being only intermittently present along one of the edges; and
      a second upwardly generally vertical extension above the head portion with an inner surface substantially parallel to the inner surface of the first vertical extension, an outer surface facing generally away from the graffiti shield with said lip, that naturally curves toward the first vertical extension, protruding beyond a top edge of the trench, said lip being capable of bending outwardly to form substantially aligned extension to the inner surface of the trench by conforming to the vertical surface of the graffiti shield when the graffiti shield is inserted into the trench, the extension being substantially parallel to the protrusion.

4. A graffiti shield mounting according to claim 3 further comprising:
   an exterior seal extending around edges of the window and along an outer face of the window and secured to the frame.

5. A graffiti shield mounting comprising:
   a graffiti shield;
   a first elastomeric seal providing a trench within which to secure the graffiti shield in place along three edges, said trench defined by a first and a second essentially parallel walls; and
   at least one second elastomeric seal providing a partial trench along a fourth edge of the graffiti shield, said partial trench comprising a first wall and a second wall which is only intermittenly present.

6. A graffiti shield mounting according to claim 5 additionally comprising:
   a frame having a trough for holding the first and second seals in place.

7. A graffiti shield mounting according to claim 5 additionally comprising:

a window surrounded by the frame.

8. A graffiti shield mounting, comprising:

a window;

a graffiti shield;

a window frame;

a rigid adaptor frame, at least partially insertable in the window frame;

an exterior elastomeric seal which fits against an interior wall of the adaptor frame; and an interior elastomeric seal at least partially inserted into the adaptor frame adjacent to the exterior seal, and to an interior side of the window for securing the window in the adaptor frame and securing the graffiti shield to the adaptor frame.

9. A graffiti shield mounting according to claim 8 wherein the adapter frame comprises a downwardly directed extension fitted into the window frame.

10. A graffiti shield mounting according to claim 8 wherein the exterior seal comprises a downwardly directed extension bed which is at least partially insertable into the adapter frame.

11. A graffiti shield mounting according to claim 8 wherein the adaptor frame further comprises:

an upwardly directed projection which extends above the window frame, having an inner wall against the exterior seal;

a longitudinally extending opening for at least partial insertion of the exterior seal; and a longitudinally extending trough for at least partial insertion of the interior seal.

12. A graffiti shield mounting according to claim 8 wherein the adaptor frame further comprises:

an upwardly directed projection which extends above the window frame, having an inner wall surface against the exterior seal;

a longitudinally extending opening for at least partial insertion of the exterior seal; and a longitudinally extending trough for at least partial insertion of the interior seal; and a downwardly directed extension for insertion into the window frame.

13. A graffiti shield mounting, comprising:

a window;

a graffiti shield;

a window frame;

an adapter frame, at least partially insertable in the window frame, the adaptor frame further comprising:

an upwardly directed projection extending above the window frame, said projection having an inner wall surface;

a longitudinally extending opening; and a horizontally directed extension defining a surface at a bottom of an exposed wall of the adaptor frame, the wall having sockets;

an elastomeric exterior seal adjacent to the inner wall surface of the upwardly directed projection, said exterior seal at least partially insertable in the longitudinally extending opening;

an interior elastomeric seal adjacent to the exposed wall, and adjacent to the exterior seal, and adjacent to an interior surface of the window, thus providing a means of securing the window in the adaptor frame, the interior seal further comprising teeth extending towards the exposed wall, the teeth being at least partially insertable in the sockets the exposed wall, the teeth which provide a means of releasably securing the interior seal to the adaptor frame, the interior seal being at least partially insertable in the window frame along with the adaptor frame, the interior seal maintaining at least a partially exposed wall after such insertion; and a means to secure the graffiti shield to the interior seal.

* * * * *